United States Patent
Wei et al.

(10) Patent No.: US 11,196,774 B2
(45) Date of Patent: Dec. 7, 2021

(54) NETWORK APPLICATION SECURITY QUESTION DETECTION AND MODIFICATION

(71) Applicant: INTERNATIONAL BUSINESS MACHINES CORPORATION, Armonk, NY (US)

(72) Inventors: Yi-hsiu Wei, Austin, TX (US); David Yu Chang, Austin, TX (US); Ching-Yun Chao, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 140 days.

(21) Appl. No.: 16/809,962

(22) Filed: Mar. 5, 2020

(65) Prior Publication Data
US 2021/0281612 A1    Sep. 9, 2021

(51) Int. Cl.
*H04L 29/06* (2006.01)
*H04L 12/08* (2006.01)

(52) U.S. Cl.
CPC ............ *H04L 63/205* (2013.01); *H04L 12/08* (2013.01); *H04L 63/08* (2013.01); *H04L 63/101* (2013.01); *H04L 63/105* (2013.01)

(58) Field of Classification Search
CPC ....... H04L 12/08; H04L 63/08; H04L 63/101; H04L 63/105; H04L 63/205
USPC .......................................................... 726/4
See application file for complete search history.

(56) References Cited

U.S. PATENT DOCUMENTS

| 8,856,943 | B2 | 10/2014 | Carter | |
|---|---|---|---|---|
| 10,192,457 | B2 | 1/2019 | Ajmera | |
| 2012/0159647 | A1 | 6/2012 | Sanin | |
| 2019/0394195 | A1* | 12/2019 | Chari | ............ H04L 63/18 |
| 2020/0110859 | A1* | 4/2020 | Kulkarni | ............ H04L 63/08 |

OTHER PUBLICATIONS

Mell, Peter et al.; "The NIST Definition of Cloud Computing;" National Institute of Standards and Technology; Special Publication 800-145; Sep. 2011; 7 pages.

(Continued)

*Primary Examiner* — Benjamin A Kaplan
(74) *Attorney, Agent, or Firm* — Schmeiser, Olsen & Watts; William H. Hartwell

(57) ABSTRACT

A method, system, and computer program product for detecting a network application security question is provided. The method includes receiving permission to access social media sources of a user. The social media sources and Internet based sources of the user are monitored in response to receiving the permission and associated data is generated and stored. A request for access to a secure account of the user is received and a list of security questions is presented to the user. The list of security questions is analyzed with respect to the data and each security question is ranked. An answer to a question of the list is received and analyzed and security attributes of the answer with respect to a potential malicious attempt to provide a predicted answer to for access to secure account are determined. A resulting security process with respect to enabling access to the secure account is executed.

20 Claims, 6 Drawing Sheets

(56) References Cited

OTHER PUBLICATIONS

Albayram, Y., & Khan, M. M. H. (2016). Evaluating smartphone-based dynamic security questions for fallback authentication: a field study. Human-centric Computing and Information Sciences, 6(1), 16.

Bonneau, J., Bursztein, E., Caron, I., Jackson, R., & Williamson, M. (May 2015). Secrets, lies, and account recovery Lessons from the use of personal knowledge questions at Google. In Proceedings of the 24th international conference on world wide web (pp. 141-150). International World Wide Web Conferences Steering Committee.

Ibrahim, A. (2017). Data Science Solution for User Authentication. Electronic Thesis and Dissertation Repository. The University of Western Ontario: Graduate Program in Electrical and Computer Engineering.

Newman, L. H. (Jun. 2017). Time to Kill Security Questions—or Answer Them With Lies. Retrieved Sep. 26, 2019, from https://www.wired.com/2016/09/time-kill-security-questions-answer-lies/.

* cited by examiner

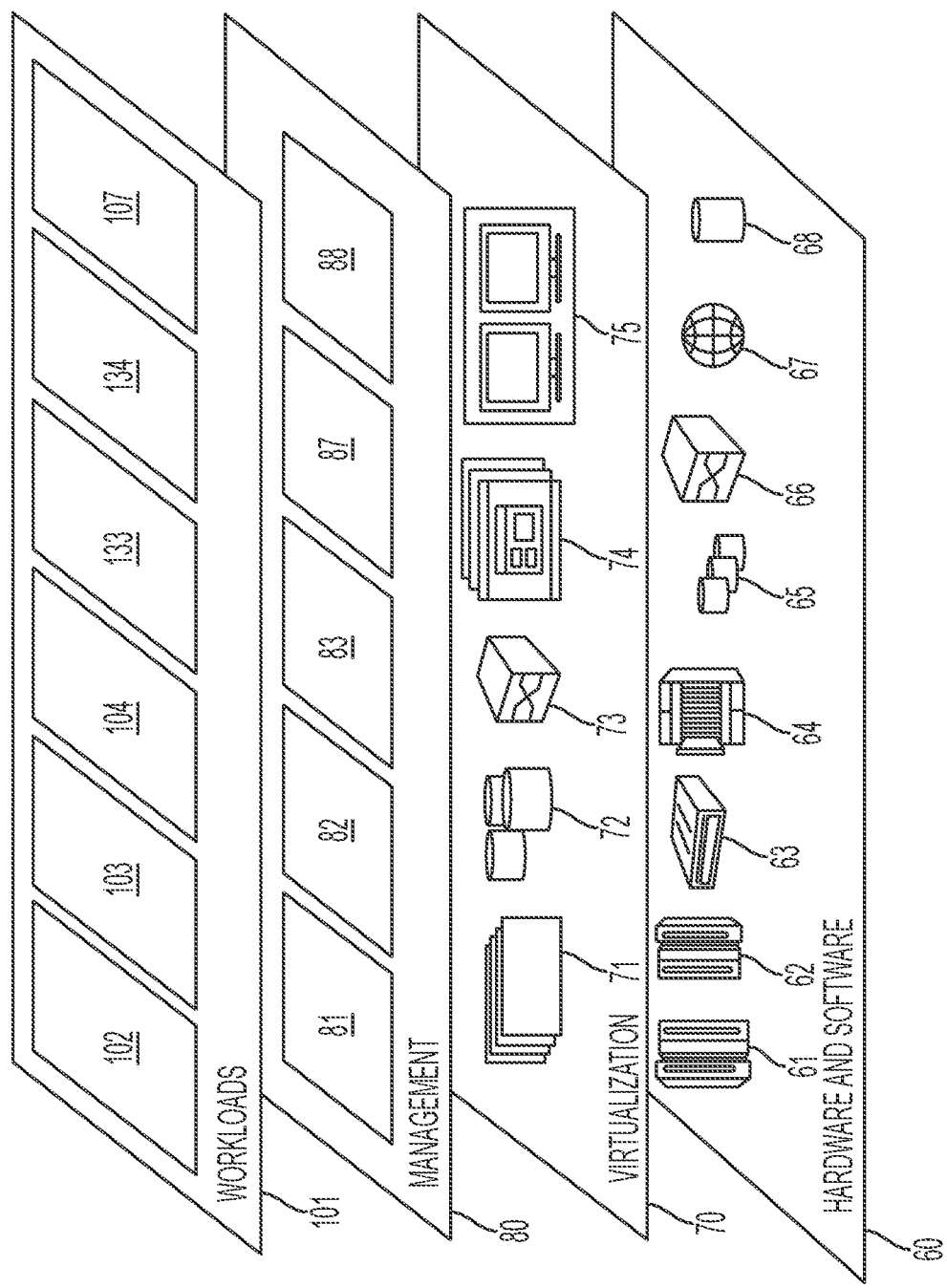

NETWORK APPLICATION SECURITY QUESTION DETECTION AND MODIFICATION

BACKGROUND

The present invention relates generally to a method for detecting network application security issues and in particular to a method and associated system for improving network application security technology associated with monitoring network application usage, ranking and modifying user security questions associated with enabling access to a secure account of a user; and executing a resulting security process with respect to enabling access to the secure account.

SUMMARY

A first aspect of the invention provides a network application security question detection method comprising: receiving, by a processor of a hardware device from a user, permission to access social media sources of the user; monitoring, by the processor in response to the receiving the permission, the social media sources and Internet based sources of the user; generating, by the processor, data representing results of the monitoring; storing, by the processor, the data within a specialized database; receiving, by the processor from the user, a request for access to a secure account of the user; presenting, by the processor to the user in response to the request, a list of security questions associated with the user; analyzing, by the processor, the list of security questions with respect to the data; ranking, by the processor based on results of the analyzing the list, each security question of the list of security questions; receiving, by the processor in response to results of the ranking, an answer to a first question of the list of security questions; analyzing, by the processor, the answer with respect to the results of the analyzing the list; determining, by the processor based on the results of the analyzing the answer, security attributes of the answer to the first question with respect to a potential malicious attempt to provide a predicted answer to the first question for access to the secure account of the user; and executing, by the processor based on the security attributes, a security process with respect to enabling access to the secure account of the user.

A second aspect of the invention provides a computer program product, comprising a computer readable hardware storage device storing a computer readable program code, the computer readable program code comprising an algorithm that when executed by a processor of hardware device implements a network application security question detection method, the method comprising: receiving, by the processor from a user, permission to access social media sources of the user; monitoring, by the processor in response to the receiving the permission, the social media sources and Internet based sources of the user; generating, by the processor, data representing results of the monitoring; storing, by the processor, the data within a specialized database; receiving, by the processor from the user, a request for access to a secure account of the user; presenting, by the processor to the user in response to the request, a list of security questions associated with the user; analyzing, by the processor, the list of security questions with respect to the data; ranking, by the processor based on results of the analyzing the list, each security question of the list of security questions; receiving, by the processor in response to results of the ranking, an answer to a first question of the list of security questions; analyzing, by the processor, the answer with respect to the results of the analyzing the list; determining, by the processor based on the results of the analyzing the answer, security attributes of the answer to the first question with respect to a potential malicious attempt to provide a predicted answer to the first question for access to the secure account of the user; and executing, by the processor based on the security attributes, a security process with respect to enabling access to the secure account of the user.

A third aspect of the invention provides a hardware device comprising a processor coupled to a computer-readable memory unit, the memory unit comprising instructions that when executed by the processor implements a network application security question detection method comprising: receiving, by the processor from a user, permission to access social media sources of the user; monitoring, by the processor in response to the receiving the permission, the social media sources and Internet based sources of the user; generating, by the processor, data representing results of the monitoring; storing, by the processor, the data within a specialized database; receiving, by the processor from the user, a request for access to a secure account of the user; presenting, by the processor to the user in response to the request, a list of security questions associated with the user; analyzing, by the processor, the list of security questions with respect to the data; ranking, by the processor based on results of the analyzing the list, each security question of the list of security questions; receiving, by the processor in response to results of the ranking, an answer to a first question of the list of security questions; analyzing, by the processor, the answer with respect to the results of the analyzing the list; determining, by the processor based on the results of the analyzing the answer, security attributes of the answer to the first question with respect to a potential malicious attempt to provide a predicted answer to the first question for access to the secure account of the user; and executing, by the processor based on the security attributes, a security process with respect to enabling access to the secure account of the user.

The present invention advantageously provides a simple method and associated system capable of accurately detecting network application security issues.

BRIEF DESCRIPTION OF THE DRAWINGS

FIG. 6 illustrates a set of functional abstraction layers provided by cloud computing environment, in accordance with embodiments of the present invention.

DETAILED DESCRIPTION

Figure 1:
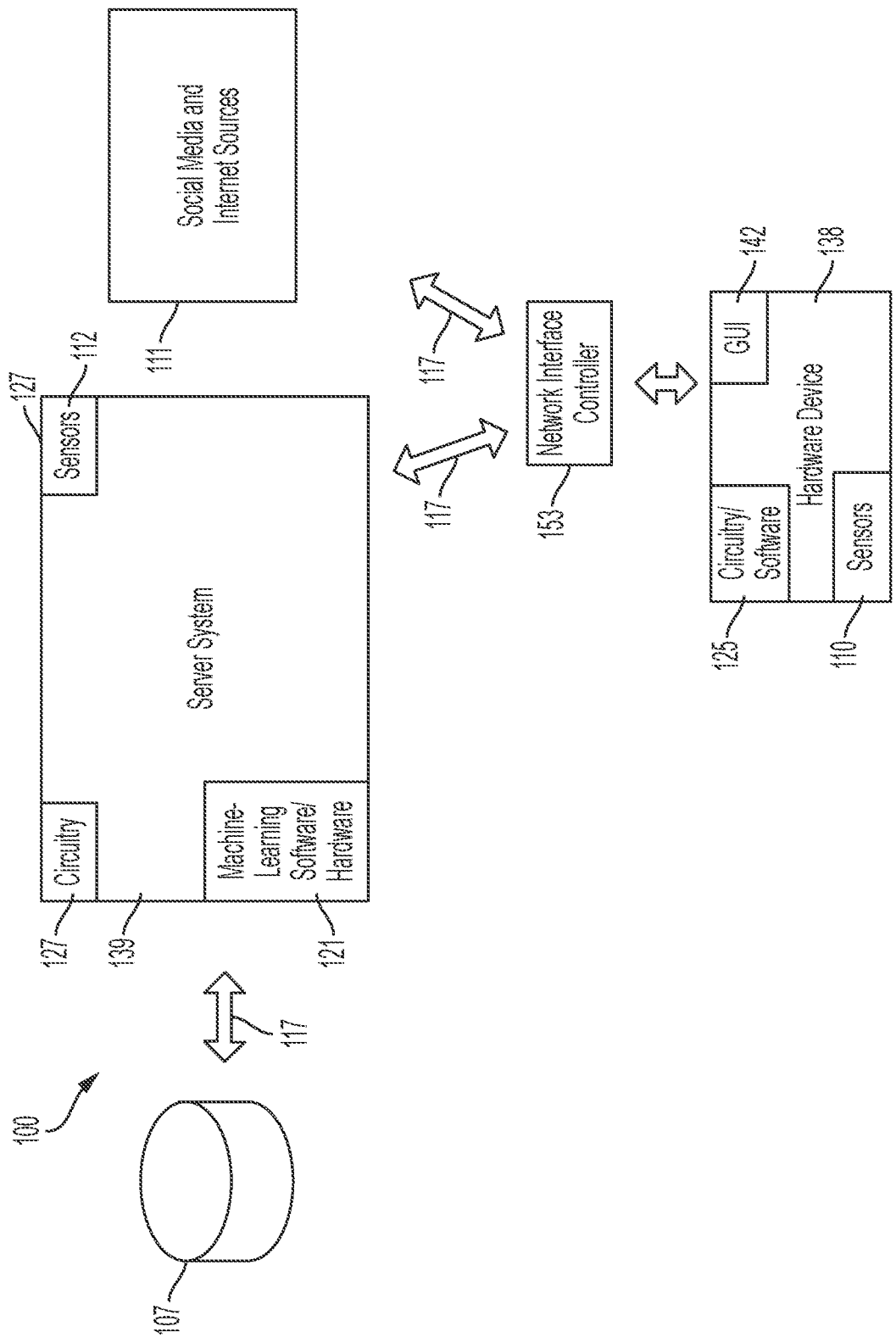
FIG. 1 illustrates a system for improving network application security technology associated with monitoring network application usage, ranking and modifying user security questions associated with enabling access to a secure account of a user; and executing a resulting security process with respect to enabling access to the secure account, in accordance with embodiments of the present invention.

FIG. 1 illustrates a system 100 for improving network application security technology associated with monitoring network application usage, ranking and modifying user security questions associated with enabling access to a secure account of a user; and executing a resulting security process with respect to enabling access to the secure account, in accordance with embodiments of the present invention. Identification questions are commonly used by service providers and institutions to enable users regain access to their accounts when a password is requested and/or a log in from a new device or location has been detected. An assumption associated with the use of identification questions is that only account owners know the correct answers to the security questions. The aforementioned assumption may be challenged as it may be very easy for a nefarious party to locate answers to identification questions such as, inter alia, "Who is your best childhood friend?", "Where did you first meet your spouse?", etc. The answers to the aforementioned example identification questions (i.e., associated with personnel information) may be located via access to Internet sources such as, inter alia, social media, public records, institutional security breaches, etc. Cyber specialists may leverage user personal data collected from the Internet and social media thereby allowing correct answers to personal identification questions to be located via a simple Internet search process. Therefore, system 100, enables a process for countering intelligent cyberattacks by leveraging big data analytics to make it difficult to breach user accounts with intelligence and web sourced answers to identification questions.

System 100 is enabled to leverage big data analytics for defending against cyber-attacks. System 100 is configured to creates a service/software (e.g., circuitry/software 125 in FIG. 1) to study a user's personal data (in response to receiving user authorization) by analyzing user information available via Internet and/or social media sources. The service/software collects information about the user from Internet sources. The aforementioned information may be easily obtained by a malicious user. The service service/software additionally collects information about the user (in response to receiving user authorization) from social media sources such, inter alia, as email, social media postings, etc. User authorization enables the service/software to access data within a user account and data shared with the user by friends and connections. Therefore, if a social media account is compromised (e.g., an account of the user or an account of a friend or connection), the aforementioned data may be determined to be exposed to malicious users.

The service/software is configured to analyze the aforementioned data to determine an answer a personal question about the user. The service/software may be enabled to select security questions (for a list of security questions) to answer and may review all security questions and provide answers with generated confidence levels. Subsequently, users may select questions from the list that are determined to be least likely to be answered by another party.

The service/software may be additionally configured to generate answers to security questions that are difficult for a nefarious party to guess. For example, service/software enable a user set a question as a negative question allowing the user to set a constraint for a security question such as "Where did you first meet your spouse?" such that the question must not be answered with the correct answer. Therefore, if a malicious user is determined to be able to easily locate correct answer to the security question "Where did you first meet your spouse?", then a user may turn the security question into a trap as an incorrect answer is required. System 100 allows service/software to: grade a quality of a security question; recommend security questions to use from a given list; grade an answer to a security question; and recommend a high-quality answer to a security question.

System 100 enables an improved network application security process as follows:

The process is initiated when a user grants system 100 permissions to access the user's social media contents. Subsequently, system 100 monitors and searches Internet and social media to generate a knowledge database of the user such that when the user receives a list of questions for selection or when the user create a custom question, system 100 evaluates how likely another user may locate answers to the questions. The questions and answers may be additionally ranked to determine if a question comprises a good candidate. When a user supplies an answer to a question, system 100 may evaluate how likely another user may guess a correct answer. Additionally, system 100 may recommend questions and suggest the questions for the user based on a difficulty level with respect to another user guessing a correct answer. The aforementioned process may continue to monitor and evaluate if a question and answer pair remain an adequate choice for the user.

System 100 of FIG. 1 includes a server system 139 (i.e., specialized hardware device), a hardware device 138, a network interface controller 153, social media and Internet sources 111, and a database 107 (e.g., a cloud-based system) interconnected through a network 117. Server system 139 includes specialized circuitry 127 (that may include specialized software), sensors 112, and machine learning software code/hardware structure 121 (i.e., including machine learning software code). Interface controller 153 may include any type of device or apparatus for securely interfacing hardware and software to a network. Hardware device 138 may include, inter alia, dedicated hardware, a smart phone, a tablet computer, a computing device, etc. Hardware device 138 may be Bluetooth enabled to provide connectivity to each other and any type of system. Hardware device 138 includes specialized circuitry 125 (that may include specialized software/service), sensors 110, and a GUI 142. Sensors 110 and 112 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Social media and Internet sources 111 may comprise any type of social media Websites and/or Internet Websites. Server system 139 and hardware device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server system 139 and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving network application security technology associated with monitoring network usage, ranking and modifying user security questions associated with enabling access to a secure account of a user; and executing a resulting security process with respect to enabling access to the secure account. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables a process for training a service using data from Internet and social media sources. The service analyzes a user (associated with the Internet and social media sources) and enables the user to select secure security questions. System 100 comprises the following capabilities:

1. Grading a quality of a security question: A security question may comprise a high grade if an availability and quality of associated answers located via big data analytics are determined to be low. Likewise, an availability of an answer may comprise a high grade if the answer appears in or may be derived from more than one distinct semantically matched source. A quality of an answer may be rated high if a data source is associated with a high level of trustworthiness.

2. Recommending security questions (for usage) from a given list: System 100 may be enabled to review a given list of the security questions and recommend question associated with a high security grading.

3. Recommending security questions: System 100 is configured to source popular questions (from user defined security questions and answers) from Internet sources, vet, and recommend high quality questions based on associated criteria.

4. Grading an answer to a security question: When a user selects questions a given set of security questions, system 100 is configured to grade her/his answer for weakness.

5. Recommending a high-quality answer to a security question: In order to protect a critical account, a user should always use a high-quality answer. System 100 may be configured to recommend a high-quality answer that is counter intuitive or may counter a fact pattern of the question. For example, system 100 may recommend an answer that is opposite to a real fact such as "my sister is single" although she is married. Therefore, a hacker may be rejected during an attempted account breach.

The following process describes an implementation example associated with enabling user authorization to an online entity based on analyzed and generated security question and related answers. The process includes: building a personal fact knowledge database (PFKB), building a security question/answer (QA) database, evaluating QA quality and recommend high-quality QAs, elevating QA quality, and securing QA chaining.

Building a PFKB includes logging into user accounts (i.e., with granted permission such as access to a user's mobile phone and applications) and scanning information across all possible data sources, including, inter alia, financial institutions, health services, organizational portals, governmental records, work records, personal mail, computer disks, mobile phones, portable hard drives, social network accounts, public records, etc. In response, system 100 enables natural language processing and data model builder techniques to extract facts associated with the user including all attributes, objects, and associations related to the user. All user interactions are scanned to identify all objects and associations of the user. Subsequently, system 100 attaches each object with an associated number of times the object has been detected in the data sources. A resulting collection of the objects and associations are used to build the PFKB. The PFKB is continuously updated through constant scanning of new updates with respect to a variety of systems and social networks.

Building a security QA database includes constructing a high-quality personal security QA Database from the PFKB by pairing two related objects as a QA structure. Additionally, information sources a classified into public records (e.g., a Web crawler), restricted Records (e.g., finance accounts, health accounts, etc.), controlled records (e.g., social networks), and private records (e.g., home computer data). The security QA database generates a secrecy score based on, inter alia, a number of times that a QA object is recited within a data source. If a QA object is recited many times within the social interactions of the data source, the QA object is assigned a low secrecy score. If the QA object is extracted from a searched public record, it may be assigned a low secrecy score compared with a QA object that is extracted from a financial record. If a QA object is detected within two data sources, an associated secrecy score is determined by a data source class of a lower secrecy score.

Evaluating a QA quality and recommending high-quality QAs includes verifying a QA with respect to the QA database to determine a secrecy score. A QA quality is acceptable when a secrecy score is high. If the QA is not included within the QA database, a secrecy of the QA based is calculated based on the rules used within the process for building the security QA database. The QA quality is determined to be acceptable when a calculated score is high. A high secrecy score is associated with recommending a high quality QA.

Elevating QA quality may include using an alternative fact as an answer to a question. The answer may include a slight deviation from known fact, such as, inter alia, my sister's wedding is in May (instead of in the real month of June), I like the pink verses red, I am 29 years old regardless of the public record specifying a current age of 49 years old. The alternative fact answer to a question may prevent a breach by a hacker accessing user personal information.

Secure QA chaining may include selecting a number of related QAs as a group in a specified sequence such that one QA leads to another in order to generate a recommendation associated with a determined good QA or a set of good QAs. The QA chaining process enables a user to remember answers thereby increasing a QA strength. The QA chaining process enables a similar scenario as that of using a multi-word passphrase that is considered more secure and easier to remember than using a long complex password.

System 100 may extract knowledge from a user's social media interactions (i.e., upon receiving user authorization) with relatives, friends, and postings to build relationships and associated information for storage within a relational database. The relational database enables system 100 to answer to security questions with a probabilistic accuracy. Additionally, system 100 may maintain a database with facts provided by the user to verify against. Therefore, system 100 may generate recommendations for users as to what security questions to avoid. System 100 may additionally generate alternate answers to a generated security question. For example, system 100 may provide answers based on knowledge associated with the user's relatives and friends or a famous person in history. Using a question such as "where did you get married?", enables system 100 to suggest using a location of the marriage of a close friend such that an answer to the question would not be easy to obtain.

System 100 may enable an alternative approach for using a deep recurrent neural network (RNN) for studying sentences from a user's social media interactions thereby allowing system 100 to list possible answers ranked from most likely to less possible with associated probability values. Therefore, a user will reject usage of security questions that system 100 may answer with high accuracy.

Figure 2:
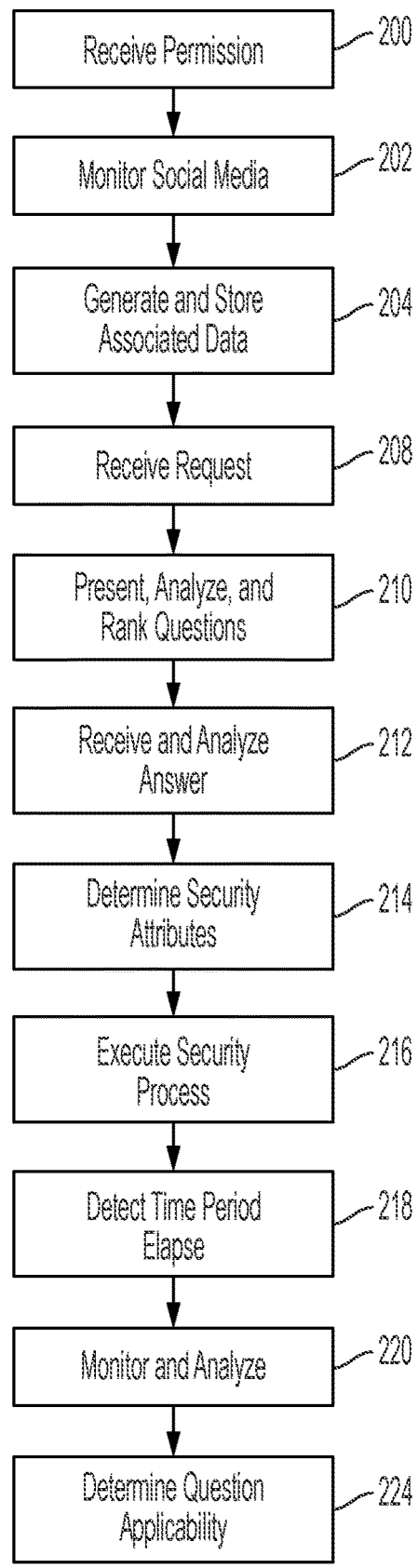
FIG. 2 illustrates an algorithm detailing a process flow enabled by the system of FIG. 1 for improving network application security technology associated with monitoring network application usage, ranking and modifying user security questions associated with enabling access to a secure account of a user; and executing a resulting security process with respect to enabling access to the secure account, in accordance with embodiments of the present invention.

FIG. 2 illustrates an algorithm detailing a process flow enabled by system 100 of FIG. 1 for improving network application security technology associated with monitoring network usage, ranking and modifying user security questions associated with enabling access to a secure account of a user; and executing a resulting security process with respect to enabling access to the secure account, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server system 139 and hardware device 138. In step 200, permission to access social media sources of a user is received (by a hardware device) from a user. In step 202, the social media sources and Internet based sources of the user are monitored in response to receiving the permission of step 200. In step 204, data representing results of the monitoring step is generated and stored within a specialized database. In step 208, a request for access to a secure account of the user is received. In step 210, a list a list of security questions associated with the user is presented (to the user), analyzed with respect to the data (of step 204), and ranked based on results of the analysis. The list of security questions may be retrieved from a preconfigured database of security questions. Alternatively, the list of security questions may be generated and stored by the user prior to executing the network application security question protection.

In step 212, an answer to a first question of the list of security questions is received in response to results of the ranking, the answer is analyzed with respect to the analysis of step 210. In step 214, security attributes are determined base on results of the analysis of step 212. Security attributes are associated with the answer to the first question with respect to a potential malicious attempt to provide a predicted answer to the first question for access to the secure account of the user.

In step 216, a security process with respect to enabling access to the secure account of the user is executed based on the security attributes. With respect to step 214, the security attributes of the answer may indicate that the answer to the first question is not related to a potential malicious attempt and therefore executing the security process may include enabling access to the secure account of the user. Alternatively (with respect to step 214), security attributes of the answer may indicate that the answer to the first question is related to a potential malicious attempt and therefore executing the security process may include:

1. Generating and presenting additional security questions associated with preventing the potential malicious attempt for access to the secure account of the user.
2. Receiving a first answer to a question of the additional security questions.
3. Enabling (based on the first answer) said access to the secure account of the user.

In step 218, it is determined that a specified time period has elapsed since enabling access to the secure account of the user. In step 220, the social media sources and Internet based sources of the user are further monitored and the answer is further analyzed with respect to the first question and results of the further monitoring process. In step 224, it is determined (based on results of step 220) if the answer and the first question are currently applicable to enabling access to the secure account of the user. If results of step 224 indicate that the answer and the first question are currently applicable to enabling access to the secure account of the user then access is enabled. If results of step 224 indicate that the answer and the first question are not currently applicable to enabling access to the secure account of the user then an additional security question and answer associated with enabling access to the secure account is generated and stored within a specialized database for future use.

Figure 3:
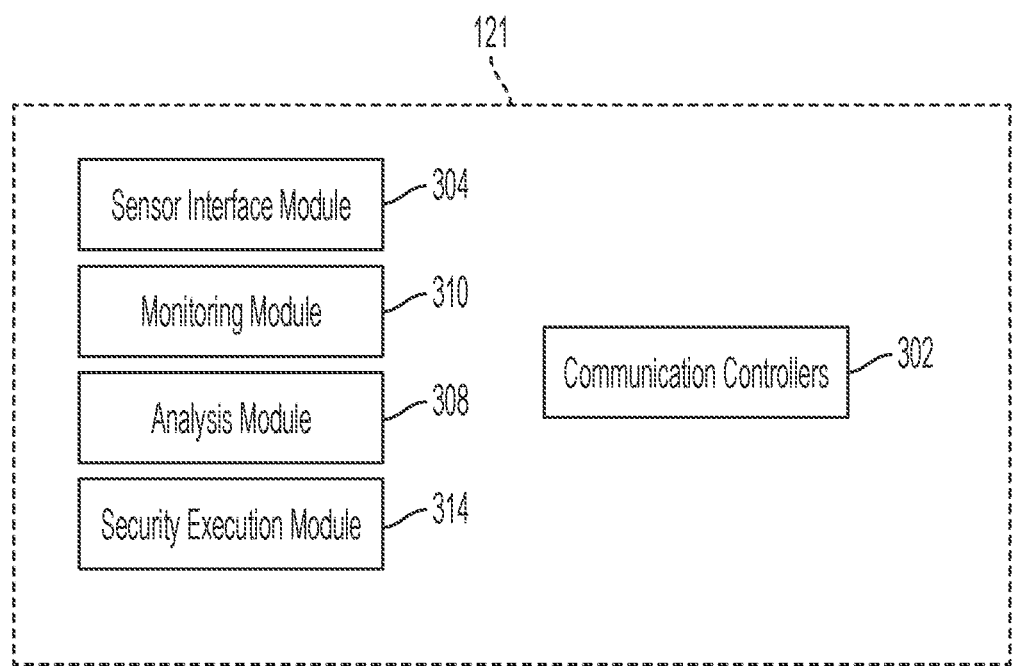
FIG. 3 illustrates an internal structural view of the machine learning software/hardware structure and/or the circuitry/software of FIG. 1, in accordance with embodiments of the present invention.

FIG. 3 illustrates an internal structural view of machine learning software/hardware structure 121 (and/or circuitry/software 125) of FIG. 1, in accordance with embodiments of the present invention. Machine learning software/hardware structure 121 includes a sensor interface module 304, a monitoring module 310, an analysis module 308, a security execution module 314, and communication controllers 302. Sensor interface module 304 comprises specialized hardware and software for controlling all functions related to sensors 110 or 112 of FIG. 1. Monitoring module 310 comprises specialized hardware and software for controlling all functionality related control of all monitoring functionality for implementing the process described with respect to the algorithm of FIG. 2. Analysis 308 comprises specialized hardware and software for controlling all functions related to the analysis steps of FIG. 2. Security execution module 314 comprises specialized hardware and software for controlling all functions related to executing security functionality for executing network application security question detection processes. Communication controllers 302 are enabled for controlling all communications between sensor interface module 304, monitoring module 310, analysis module 308, and security execution module 314.

Figure 4:
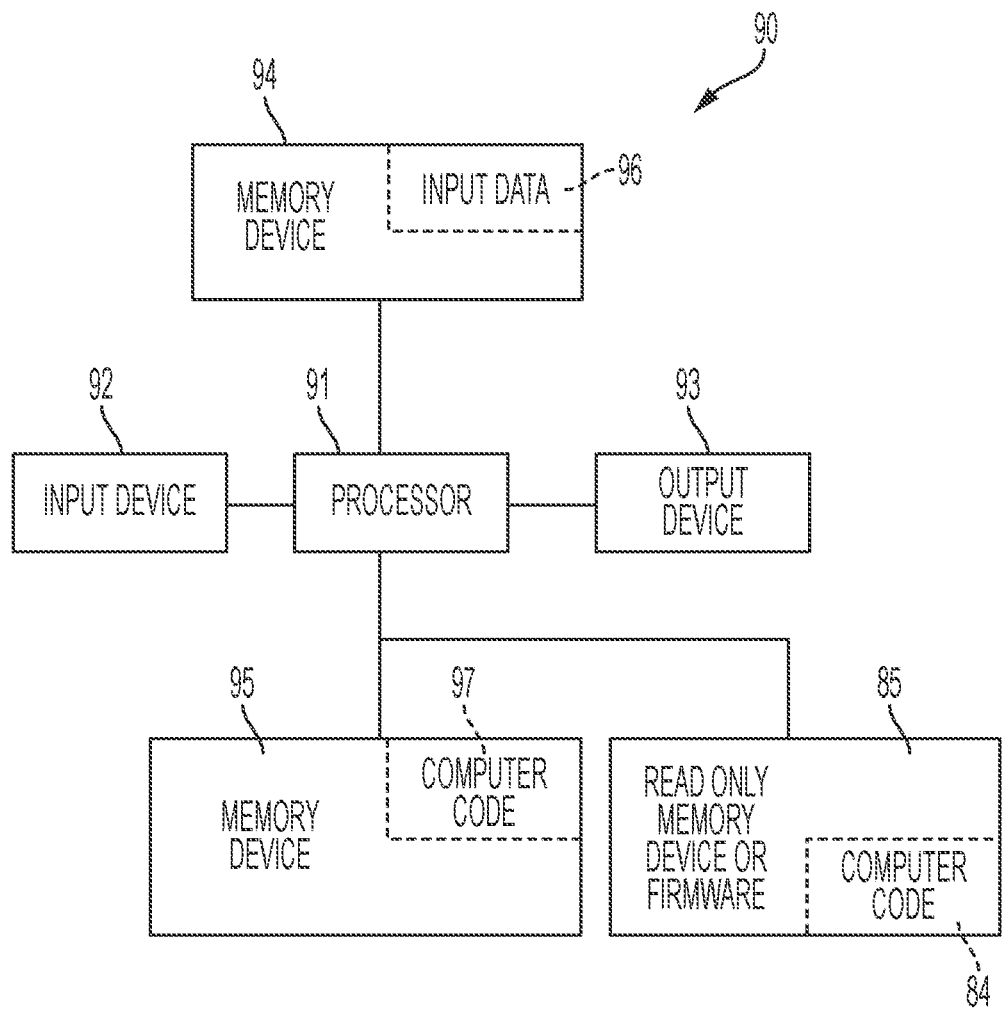
FIG. 4 illustrates a computer system used by the system of FIG. 1 for improving network application security technology associated with monitoring network application usage, ranking and modifying user security questions associated with enabling access to a secure account of a user; and executing a resulting security process with respect to enabling access to the secure account, in accordance with embodiments of the present invention.

FIG. 4 illustrates a computer system 90 (e.g., hardware device 138 and/or server system 139 of FIG. 1) used by or comprised by the system of FIG. 1 for improving network application security technology associated with monitoring network usage, ranking and modifying user security questions associated with enabling access to a secure account of a user; and executing a resulting security process with respect to enabling access to the secure account, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving network application security technology associated with monitoring network usage, ranking and modifying user security questions associated with enabling access to a secure account of a user; and executing a resulting security process with respect to enabling access to the secure account. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve network application security technology associated with monitoring network usage, ranking and modifying user security questions associated with enabling access to a secure account of a user; and executing a resulting security process with respect to enabling access to the secure account. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving network application security technology associated with monitoring network usage, ranking and modifying user security questions associated with enabling access to a secure account of a user; and executing a resulting security process with respect to enabling access to the secure account. In another embodiment, the invention provides a business method that performs the process steps of the invention on a subscription, advertising, and/or fee basis. That is, a service supplier, such as a Solution Integrator, could offer to enable a process for improving network application security technology associated with monitoring network usage, ranking and modifying user security questions associated with enabling access to a secure account of a user; and executing a resulting security process with respect to enabling access to the secure account. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a configuration of hardware and software, any configuration of hardware and software, as would be known to a person of ordinary skill in the art, may be utilized for the purposes stated supra in conjunction with the computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
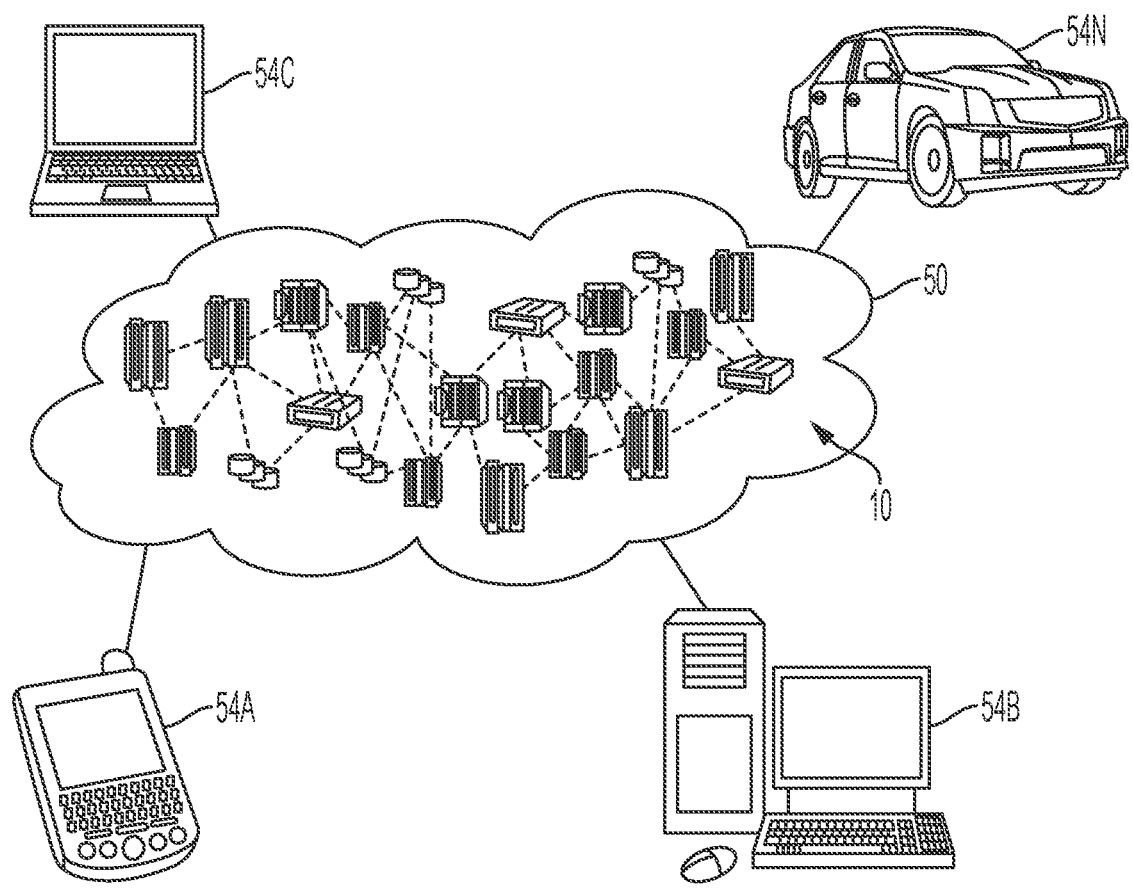
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving network application security technology associated with monitoring network usage, ranking and modifying user security questions associated with enabling access to a secure account of a user; and executing a resulting security process with respect to enabling access to the secure account 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A network application security question detection method comprising:
receiving, by a processor of a hardware device from a user, permission to access social media sources of said user;
monitoring, by said processor in response to said receiving said permission, said social media sources and Internet based sources of said user;
generating, by said processor, data representing results of said monitoring;
storing, by said processor, said data within a specialized database;
receiving, by said processor from said user, a request for access to a secure account of said user;
presenting, by said processor to said user in response to said request, a list of security questions associated with said user;
analyzing, by said processor, said list of security questions with respect to said data;
ranking, by said processor based on results of said analyzing said list, each security question of said list of security questions;
receiving, by said processor in response to results of said ranking, an answer to a first question of said list of security questions;
analyzing, by said processor, said answer with respect to said results of said analyzing said list;
determining, by said processor based on said results of said analyzing said answer, security attributes of said answer to said first question with respect to a potential malicious attempt to provide a predicted answer to said first question for access to said secure account of said user; and
executing, by said processor based on said security attributes, a security process with respect to enabling access to said secure account of said user.

2. The method of claim 1, wherein said security attributes of said answer indicate that said answer to said first question is not related to said potential malicious attempt, and wherein said executing said security process comprises:
enabling, based on said answer, said access to said secure account of said user.

3. The method of claim 1, wherein said security attributes of said answer indicate that said answer to said first question is related to said potential malicious attempt, and wherein said executing said security process comprises:
generating, based on said data, additional security questions associated with preventing said potential malicious attempt for access to said secure account of said user;
presenting, said additional security questions to said user;
receiving, by said processor in response to presenting said additional security questions, a first answer to a question of said additional security questions; and
enabling, based on said first answer, said access to said secure account of said user.

4. The method of claim 3, further comprising:
determining, by said processor, that a specified time period has elapsed since said enabling;
further monitoring, by said processor, said social media sources and Internet based sources of said user;
further analyzing, by said processor, said answer with respect to said first question and results of said further monitoring; and
additionally determining, by said processor based on said results of said further analyzing, if said answer and said first question are currently applicable to said enabling access to said secure account of said user.

5. The method of claim 4, wherein results of said additionally determining indicated that said answer and said first question are currently applicable to said enabling access to said secure account of said user, and wherein said method further comprises:
enabling, by said processor based on said answer, said answer and said first question to enable said access to said secure account of said user.

6. The method of claim 4, wherein results of said additionally determining indicated that said answer and said first question are not currently applicable to said enabling access to said secure account of said user, and wherein said method further comprises:
generating, by said processor, an additional security question and answer associated with enabling said access to said secure account of said user; and
storing, by said processor within said specialized database, said additional security question and answer for future use.

7. The method of claim 1, wherein list of security questions are retrieved from a preconfigured database of security questions.

8. The method of claim 1, wherein list of security questions are generated and stored by said user prior to executing said network application security question protection method.

9. The method of claim 1, further comprising:
providing at least one support service for at least one of creating, integrating, hosting, maintaining, and deploying computer-readable code in the control hardware, said code being executed by the computer processor to implement: said receiving said permission, said monitoring, said generating, said storing, said receiving said request, said presenting, said analyzing said list, said ranking, said receiving said answer, said analyzing said answer, said determining, and said executing.

10. A computer program product, comprising a computer readable hardware storage device storing a computer readable program code, said computer readable program code comprising an algorithm that when executed by a processor of hardware device implements a network application security question detection method, said method comprising:
receiving, by said processor from a user, permission to access social media sources of said user;
monitoring, by said processor in response to said receiving said permission, said social media sources and Internet based sources of said user;
generating, by said processor, data representing results of said monitoring;
storing, by said processor, said data within a specialized database;
receiving, by said processor from said user, a request for access to a secure account of said user;
presenting, by said processor to said user in response to said request, a list of security questions associated with said user;
analyzing, by said processor, said list of security questions with respect to said data;
ranking, by said processor based on results of said analyzing said list, each security question of said list of security questions;
receiving, by said processor in response to results of said ranking, an answer to a first question of said list of security questions;

analyzing, by said processor, said answer with respect to said results of said analyzing said list;

determining, by said processor based on said results of said analyzing said answer, security attributes of said answer to said first question with respect to a potential malicious attempt to provide a predicted answer to said first question for access to said secure account of said user; and executing, by said processor based on said security attributes, a security process with respect to enabling access to said secure account of said user.

11. The computer program product of claim 10, wherein said security attributes of said answer indicate that said answer to said first question is not related to said potential malicious attempt, and wherein said executing said security process comprises:

enabling, based on said answer, said access to said secure account of said user.

12. The computer program product of claim 10, wherein said security attributes of said answer indicate that said answer to said first question is related to said potential malicious attempt, and wherein said executing said security process comprises:

generating, based on said data, additional security questions associated with preventing said potential malicious attempt for access to said secure account of said user;

presenting, said additional security questions to said user;

receiving, by said processor in response to presenting said additional security questions, a first answer to a question of said additional security questions; and enabling, based on said first answer, said access to said secure account of said user.

13. The computer program product of claim 12, wherein said method further comprises:

determining, by said processor, that a specified time period has elapsed since said enabling;

further monitoring, by said processor, said social media sources and Internet based sources of said user;

further analyzing, by said processor, said answer with respect to said first question and results of said further monitoring; and additionally determining, by said processor based on said results of said further analyzing, if said answer and said first question are currently applicable to said enabling access to said secure account of said user.

14. The computer program product of claim 13, wherein results of said additionally determining indicated that said answer and said first question are currently applicable to said enabling access to said secure account of said user, and wherein said method further comprises:

enabling, by said processor based on said answer, said answer and said first question to enable said access to said secure account of said user.

15. The computer program product of claim 13, wherein results of said additionally determining indicated that said answer and said first question are not currently applicable to said enabling access to said secure account of said user, and wherein said method further comprises:

generating, by said processor, an additional security question and answer associated with enabling said access to said secure account of said user; and storing, by said processor within said specialized database, said additional security question and answer for future use.

16. The computer program product of claim 10, wherein list of security questions are retrieved from a preconfigured database of security questions.

17. The computer program product of claim 10, wherein list of security questions are generated and stored by said user prior to executing said network application security question protection method.

18. A hardware device comprising a processor coupled to a computer-readable memory unit, said memory unit comprising instructions that when executed by the processor implements a network application security question detection method comprising:

receiving, by said processor from a user, permission to access social media sources of said user;

monitoring, by said processor in response to said receiving said permission, said social media sources and Internet based sources of said user;

generating, by said processor, data representing results of said monitoring;

storing, by said processor, said data within a specialized database;

receiving, by said processor from said user, a request for access to a secure account of said user;

presenting, by said processor to said user in response to said request, a list of security questions associated with said user;

analyzing, by said processor, said list of security questions with respect to said data;

ranking, by said processor based on results of said analyzing said list, each security question of said list of security questions;

receiving, by said processor in response to results of said ranking, an answer to a first question of said list of security questions;

analyzing, by said processor, said answer with respect to said results of said analyzing said list;

determining, by said processor based on said results of said analyzing said answer, security attributes of said answer to said first question with respect to a potential malicious attempt to provide a predicted answer to said first question for access to said secure account of said user; and executing, by said processor based on said security attributes, a security process with respect to enabling access to said secure account of said user.

19. The hardware device of claim 18, wherein said security attributes of said answer indicate that said answer to said first question is not related to said potential malicious attempt, and wherein said executing said security process comprises:

enabling, based on said answer, said access to said secure account of said user.

20. The hardware device of claim 18, wherein said security attributes of said answer indicate that said answer to said first question is related to said potential malicious attempt, and wherein said executing said security process comprises:

generating, based on said data, additional security questions associated with preventing said potential malicious attempt for access to said secure account of said user;

presenting, said additional security questions to said user;

receiving, by said processor in response to presenting said additional security questions, a first answer to a question of said additional security questions; and enabling, based on said first answer, said access to said secure account of said user.

* * * * *